United States Patent
Li et al.

(10) Patent No.: US 10,143,957 B2
(45) Date of Patent: Dec. 4, 2018

(54) HIGH-EFFICIENCY GRADIENT HIERARCHY COMPLEX DESULFURIZING TOWER

(71) Applicants: HUANENG POWER INTERNATIONAL, INC., Beijing (CN); WUHAN KAIDI ELECTRIC POWER ENVIRONMENTAL CO., LTD., Hubei (CN)

(72) Inventors: Weidong Li, Beijing (CN); Hong Zhao, Hubei (CN); Changmin Han, Hubei (CN); Yong He, Beijing (CN); Yi Zhang, Hubei (CN)

(73) Assignees: HUANENG POWER INTERNATIONAL, INC., Beijing (CN); WUHAN KAIDI ELECTRIC POWER ENVIRONMENTAL CO., LTD., Hubei (CN)

( * ) Notice: Subject to any disclaimer, the term of this patent is extended or adjusted under 35 U.S.C. 154(b) by 0 days.

(21) Appl. No.: 15/577,046

(22) PCT Filed: Jul. 20, 2016

(86) PCT No.: PCT/CN2016/090766
§ 371 (c)(1),
(2) Date: Nov. 27, 2017

(87) PCT Pub. No.: WO2017/012557
PCT Pub. Date: Jan. 26, 2017

(65) Prior Publication Data
US 2018/0140991 A1    May 24, 2018

(30) Foreign Application Priority Data

Jul. 21, 2015   (CN) .................. 2015 2 0530484 U
Oct. 9, 2015    (CN) .................. 2015 2 0778413 U

(51) Int. Cl.
B01D 47/00    (2006.01)
B01D 47/12    (2006.01)
(Continued)

(52) U.S. Cl.
CPC ............. *B01D 47/12* (2013.01); *B01D 53/50* (2013.01); *B01D 53/504* (2013.01); *B01D 53/80* (2013.01);
(Continued)

(58) Field of Classification Search
None
See application file for complete search history.

(56) References Cited

U.S. PATENT DOCUMENTS 4,670,224 A * 6/1987 Stehning ............... C01F 11/464
                                                        261/22
5,928,615 A * 7/1999 Strock .................. B01D 53/504
                                                        261/124
(Continued)

FOREIGN PATENT DOCUMENTS

CN    2546068         4/2003
CN    203090748 U  *  7/2013
(Continued)

OTHER PUBLICATIONS

Translation of CN203090748, accessed Jul. 18, 2018 (Year: 2013).*
Official Communication issued in Patent Application No. PCT/CN2016/090766, dated Oct. 18, 2016.

*Primary Examiner* — Duane Smith
*Assistant Examiner* — Phillip Y Shao
(74) *Attorney, Agent, or Firm* — Greenblum & Bernstein, P.L.C.

(57) ABSTRACT

A high-efficiency gradient hierarchy complex desulfurizing tower includes a tower body. The tower body tower includes an oxidization and crystallization stage, a coarse desulfur-
(Continued)

ization and dedusting stage, a fine desulfurization and dedusting stage, and a horizontal demisting stage from the bottom up. The oxidization and crystallization stage tower includes a pond and a separation mechanism provided in the pond and separating the pond into an upper area and a lower area. The coarse desulfurization and dedusting stage tower includes a gas distributing board and a multi-layer spray layer that are placed above a gas import, the spray layer being in connection with the pond. The fine desulfurization and dedusting stage tower includes a tube demister, a flushing layer, a film liquid holdup layer, a liquid holdup layer recycling can, the pH of slurry in the liquid holdup layer recycling can being higher than the pH of slurry in the pond.

14 Claims, 12 Drawing Sheets

(51) Int. Cl.
*B01D 53/50* (2006.01)
*B01D 53/80* (2006.01)
*B01D 45/12* (2006.01)

(52) U.S. Cl.
CPC ........ *B01D 45/12* (2013.01); *B01D 2251/404* (2013.01); *B01D 2251/606* (2013.01); *B01D 2258/0283* (2013.01)

(56) References Cited

U.S. PATENT DOCUMENTS

| | | | |
|---|---|---|---|
| 6,187,278 B1* | 2/2001 | Brown | B01D 53/504 423/243.06 |
| 7,635,455 B2* | 12/2009 | Moser | B01D 53/18 210/623 |
| 8,440,006 B2* | 5/2013 | Laslo | B01D 53/18 261/121.1 |
| 2010/0266472 A1* | 10/2010 | Peng | B01D 53/1481 423/243.01 |
| 2011/0083592 A1* | 4/2011 | McDonald | B01D 53/501 110/215 |
| 2014/0017119 A1* | 1/2014 | DeVault | B01D 53/50 422/7 |

FOREIGN PATENT DOCUMENTS

| | | |
|---|---|---|
| CN | 204469533 | 7/2015 |
| CN | 204841409 | 12/2015 |

* cited by examiner

HIGH-EFFICIENCY GRADIENT HIERARCHY COMPLEX DESULFURIZING TOWER

The present disclosure claims the benefit of priorities of Chinese Patent Application Nos. CN201520530484.0 and CN201520778413.2.

TECHNICAL FIELD

The present disclosure relates to a desulfurizing tower, especially a high-efficiency gradient hierarchy complex desulfurizing tower.

RELATED ART

In recent years, coal-fired power plants in China eager to cope with China's environmental threshold value pressure generally use medium low sulfur coal, which is high in price, but low in sulfur content and ash, and high in calorific value. Ultra-low emission techniques suitable for medium low sulfur coal (Sar<1.5%) have been in commission and operation successfully. However, so far cases in which ultra-low emission techniques suitable for medium high sulfur coal and high sulfur coal (Sar>1.5%) are in successful commission and operation have not yet appeared.

However, approximately 30% coals of China's coal resources have a sulfur content of 2% or more, and in particular, some coal mines in Southwest China have a sulfur content up to 10%. In districts such as Shanxi Province in China, coals with a sulfur content higher than 2% are widely used due to economical differences and regional coal differences; meanwhile, with an ever increasing utilization of high quality coals, coal-fired power plants in China will have to face a situation in which the amount of low sulfur coal decreases and fuel cost increases so that they are forced to use medium high sulfur coal and high sulfur coal; in addition, national and local governments of China have strengthened control of thermal power plants' pollutant emission concentration, and proposed a series of strict emission standards, which need to be reached using high performance desulfurization techniques with deep desulfurization and high-efficiency dedusting.

Coal combustion flue gases contain large amounts of $SO_2$, flue dust, and also contain small amounts of pollutants such as HCl, HF, $SO_3$, heavy metals, and the like. Currently, wet flue gas desulfurizing devices are most commonly used in flue gas desulfurization, and limestone-gypsum wet flue gas desulfurization is most widely applied among all wet desulfurization methods. The main function of a limestone-gypsum desulfurizing tower is to remove $SO_2$, and the desulfurizing tower also has the auxiliary function of removing flue dust and other pollutants. Desulfurization efficiency of conventional wet desulfurization methods is required to be 90% to 95%. In China, there are successful operational cases with desulfurization efficiency of 98%, but for units burning high sulfur coal, no precedent for using wet desulfurizing devices that can reach the emission requirements of gas-fired units exists. However, there is no such high performance desulfurization requirement for wet desulfurizing devices in other countries because the total amount of coal-fired units is not large (compared to that in China).

As for medium high sulfur coal and high sulfur coal, if $SO_2$ content of the flue gas at the outlet of a desulfurizing device is to be reduced to 35 mg/Nm³ or less, the desulfurization efficiency shall exceed 99%, or even higher desulfurization efficiency is needed. Therefore, developing novel desulfurizing towers and improving deep desulfurization performance of desulfurizing towers to reduce $SO_2$ content in the discharged flue gas to lower than 35 mg/Nm³ or even to achieve ultra-low $SO_2$ emission of lower than 20 mg/Nm³ are important tasks of achieving abatement of medium high sulfur coal and high sulfur coal flue gas, and have positive effects on solving the haze problem and improving atmospheric quality.

A limestone-gypsum desulfurizing tower generally takes the form of a single spray tower, and is in a counter-current arrangement. Flue gases enter an absorption tower from an upper area of a slurry pond through an inlet port of the absorption tower, and sequentially go through a spray layer, a demister, followed by emission through a chimney. Slurry is ejected by a plurality of nozzles of each spray layer, moves downward, contacts counter-currently and interacts physically and chemically with the flue gases, and washes and removes sulfur dioxide in the flue gases, at the same time interactions such as inertial impaction, interception, diffusion, agglomeration, gravity sedimentation and the like occur between dust particles in the gases and the droplets so that the dust particles are trapped. After the slurry absorbed sulfur oxide $SO_2$, flue dust and other pollutant from the flue gases, it falls into the slurry pond in a lower section of the desulfurizing tower, and undergoes forced oxidation and crystallization in the slurry pond.

There are two main reasons why desulfurization efficiency of conventional limestone-gypsum desulfurizing devices is restricted: 1) restricted by conditions such as oxidation and crystallization of gypsum, dissolution of limestone, and consumption control, and the like, generally the pH value of the absorption slurry is 5.2 to 5.8, which restricts the activity of absorbents; 2) restricted by the single tower, total flow rate of the absorption slurry cannot be too high, otherwise it may cause an overcapacity of the liquid in the tower and lead to abrupt increase in the pressure drop of the flue gases, so that operation is impossible.

In order to solve the problems described above, techniques of series-connected towers are applied. Series-connected absorption towers are two absorption towers connected in series by a flue. Flue gases introduced through an induced draft blower of a boiler first enter a primary absorption tower, and part of $SO_2$ in the flue gases is removed by washing in the primary absorption tower, the desulfurization efficiency is typically 30 to 80% and the pH of the slurry is controlled at 4.5 to 5.3. The main function of the primary absorption is to guarantee excellent oxidation effect for calcium sulfite and enough crystallization time for gypsum. Especially for high sulfur coal, oxidation air coefficient may be greatly decreased, so that the power consumption of an oxidation blower is significantly decreased, and the quality of gypsum may be considerably improved, and the dehydration ratio of gypsum is also increased. The flue gases from the primary absorption tower enter a secondary absorption tower, which performs the main desulfurization and washing process. Since oxidation and crystallization do not have to be considered, the pH value can be controlled at a very high level of up to 5.8 to 6.4, so that the high-efficiency $SO_2$ removal performance of the absorbent is fully deployed, and the $SO_2$ content in the flue gases at a discharge port of the desulfurizing tower is decreased to lower ranges.

To some extent, the techniques of series-connected towers achieve ultra-high desulfurization efficiency of medium high sulfur coal and high sulfur coal, and resolve the issue of emission compliance, but the techniques of series-connected towers have multiple disadvantages: 1) initial investment of the project is high; 2) since there are primary and secondary absorption towers, footprint area is large, and modification of the existing devices cannot be realized for a lot of projects; 3) the number of devices is relatively large, the device failure rate and the repair and maintenance effort are high, and the operating costs are also high.

In addition, S-type gas liquid mass transfer mechanism is an upgraded technique based on S-shaped rectangular bubble cap tray techniques in the field of chemical engineering. Conventional S-shaped rectangular bubble cap trays are suitable as gas liquid mass transfer apparatus which work under low gas velocity, clean medium and stable operating conditions. There are certain limitations in such technique if it is directly applied to limestone-gypsum wet desulfurization under high gas velocity, suspension slurry medium and variable load operating conditions.

However, current flue gas desulfurization techniques generally use empty tower dual-flow spray techniques, which has the following problems: in one aspect, spray slurry falls directly into the slurry pond at the bottom of the tower, and cannot be collected or absorbed segmentally, and the pH value of the slurry is without gradient, so that desulfurization efficiency cannot be further improved when the reaction is near its equilibrium point; in another aspect, the dedusting efficiency of spray washing is very low for fine dust in the flue gases, especially for fine dust of PM2.5 or less, in addition, high velocity flue gases may take away fine droplets ejected from spray nozzles, so that gypsum contained in these droplets also increase the emission concentration of dust.

Therefore, on the basis of the above problems exist in desulfurizing tower in the art, the following technology of the present disclosure is proposed.

SUMMARY

Problems to be Solved by the Disclosure

The object of the present disclosure is to provide a high-efficiency gradient hierarchy complex desulfurizing tower, which is used for treating medium high sulfur coal and high sulfur coal flue gases, and has excellent desulfurization efficiency and dedusting performance.

In addition, the present disclosure is further directed to solving the technical problem of providing a high-efficiency gradient hierarchy complex desulfurizing tower with an S-shaped rectangular bubble cap desulfurization and dedusting tray structure, and the the S-type gas liquid mass transfer mechanism is simple in structure, high in load adaptability, further improves dedusting and desulfurization effects, and further increases the desulfurization efficiency to 99.5% or more.

Therefore, by using the desulfurizing tower of the present disclosure, the desulfurization efficiency is over 99%, and preferably over 99.5%.

Means of Solving the Problems

The technical solutions adopted by the present disclosure to solve the technical problems thereof are as follows:

A high-efficiency gradient hierarchy complex desulfurizing tower is provided, the desulfurizing tower comprises a tower body, a gas import is provided in the middle of the tower body, a gas discharge port is provided at the top of the tower body, and the tower body comprises an oxidization and crystallization stage, a coarse desulfurization and dedusting stage, a fine desulfurization and dedusting stage, and a horizontal demisting stage from the bottom up; wherein, The oxidization and crystallization stage comprises a slurry pond provided at the bottom of the tower body, and a separation mechanism horizontally provided in the slurry pond and separating the slurry pond into an upper area and a lower area, the upper area of oxidation is provided with a plurality of oxidation air distributing tubes, and the lower area of crystallization is provided with a plurality of agitators;

The coarse desulfurization and dedusting stage comprises a gas distributing board that is placed above the gas import, and a multi-layer spray layer that is placed above the gas distributing board, and the spray layer is connected to the crystallization area of the slurry pond;

The fine desulfurization and dedusting stage comprises a tube demister, a flushing layer that is placed above the tube demister, a film liquid holdup layer that is placed above the flushing layer, and a liquid holdup layer recycling can connected to the film liquid holdup layer, and the pH value of slurry in the liquid holdup layer recycling can is higher than the pH value of slurry in the slurry pond.

The film liquid holdup layer of the present disclosure has one of the three structures below:

(a) The film liquid holdup layer comprises a liquid collector (7), an S-type gas liquid mass transfer mechanism (8) and a liquid distributor (9) from the bottom up, the liquid collector (7) is connected to an inlet of the liquid holdup layer recycling can (12), and an outlet of the liquid holdup layer recycling can (12) is connected to the liquid distributor (9) by a liquid holdup layer recycling pump (13), or, (b) The film liquid holdup layer comprises the S-type gas liquid mass transfer mechanism (8) and the liquid distributor (9) from the bottom up, a U-shaped collecting slot (8031) in the S-type gas liquid mass transfer mechanism (8) is connected to the inlet of the liquid holdup layer recycling can (12), and the outlet of the liquid holdup layer recycling can (12) is connected to the liquid distributor (9) by the liquid holdup layer recycling pump (13), or, (c) The film liquid holdup layer comprises the liquid collector (7), the S-type gas liquid mass transfer mechanism (8) and the liquid distributor (9) from the bottom up, the liquid collector (7) and the U-shaped collecting slot (8031) in the S-type gas liquid mass transfer mechanism (8) are all connected to the inlet of the liquid holdup layer recycling can (12), and the outlet of the liquid holdup layer recycling can (12) is connected to the liquid distributor (9) by the liquid holdup layer recycling pump (13).

According to the technical solutions described above, the separation mechanism is a perforated plate, or a plurality of pipes placed side by side.

According to the technical solutions described above, a gas liquid mass transfer synergizing ring is placed on interior wall of the tower body below each layer of the spray layer, and the vertical cross section of the gas liquid mass transfer synergizing ring is a triangle.

According to the technical solutions described above, the height of the gas liquid mass transfer synergizing ring is 300 mm to 2000 mm.

According to the technical solutions described above, nozzles on the spray layer are unitary nozzles or binary atomizing nozzles.

According to the technical solutions described above, the slurry pond is loaded with gypsum slurry, and the pH value of the gypsum slurry is 5.2 to 5.8.

According to the technical solutions described above, the liquid holdup layer recycling can is loaded with limestone slurry, and the pH value of the limestone slurry is 5.8 to 6.4.

According to the technical solutions described above, the S-type gas liquid mass transfer mechanism comprises at least one U-shaped support member and a tray;

The U-shaped support member is fixedly installed in the absorption tower, the U-shaped support member is provided with the U-shaped collecting slot, an oxidation air tube is installed in the U-shaped collecting slot, and a plurality of vent holes are provided on the bottom of the oxidation air tube;

The tray is vertically installed above the U-shaped support member, the tray is formed by a plurality of elongated plates with lateral S-shaped cross sections arranged in parallel, end portions of the S-shapes of the adjacent plates are interlaced and arranged with spacing, the spacing form intermediate channels, downward-facing openings of the plates form gas inlets, upward-facing openings of the plates form gas outlets, and the plates are provided with gas sealing plates at both sides of the gas inlets.

According to the technical solutions described above, lower margins of the end portions of the S-shapes of the plates in the gas outlets are provided with uniformly spaced slot openings.

According to the technical solutions described above, the shape of the slot openings is a rectangle, a triangle or a trapezoid.

According to the technical solutions described above, the area of the gas outlets is 1.5 to 4 times the area of the intermediate channels.

According to the technical solutions described above, the area of the gas inlets is 1 to 4 times the area of the intermediate channels.

According to the technical solutions described above, bottom clearances between the end portions of the S-shapes of the plates in the gas outlets and the bottoms of the gas outlets are over 20 mm.

According to the technical solutions described above, the horizontal demisting stage comprises level 1 to level 4 horizontal flue demisters, which are provided with independent water flushing and water recovering units.

Effect of the Disclosure

The present disclosure has the following advantageous effects: gradient hierarchy complex desulfurization techniques are utilized in the desulfurizing tower, which has excellent desulfurization efficiency and dedusting performance, and the desulfurization efficiency is 99% or more, preferably over 99.5%, and the dedusting efficiency is 90% or more, and the desulfurizing tower is suitable for treating medium high sulfur coal and high sulfur coal flue gases, especially for treating high sulfur coal flue gases; at the same time, since the desulfurizing tower is a single tower, it is especially suitable for modifying existing desulfurizing devices with narrow spaces and limited footprint areas.

In particular, when the unique S-type gas liquid mass transfer mechanism of the present disclosure is in operation, the limestone slurry with a high pH value is distributed to the tray by a slurry pipeline that is above the tray and from the outside of the tower, the slurry flows into the U-shaped collecting slot along the parallel direction of the plates, the slurry in the U-shaped collecting slot then flows to the outside of the tower by the slurry pipeline to form a cycle while the slurry forms a layer of limestone slurry film on the tray; the flue gases enter through the gas inlets, and due to the gas sealing plates provided at both sides of the gas inlets, the flue gases can only enter the intermediate channels, and then enter the slurry film on the tray through the bottom clearances of the gas outlets. The flue gases mix thoroughly with the slurry, form the froth regime or the steady spray regime and interact with the slurry, which increases mass transfer area, improves mass transfer effects while preventing slurry particles from deposition, and gases and liquids contact thoroughly under high pH conditions, and the desulfurization efficiency is significantly improved.

At the same time, by providing the U-shaped collecting slot with the oxidation air tube, in one aspect the oxidation air may oxidize sulfites in the U-shaped collecting slot, and prevent the formation of hard scale of sulfates and soft scale of sulfites, in another aspect, the oxidation air may stir the slurry and prevent the formation of deposited fouling. The present disclosure efficiently improves the desulfurization and dedusting performance.

BRIEF DESCRIPTION OF THE DRAWINGS

The present disclosure will be further described below with reference to the drawings and embodiments. In the drawings:

FIGS. 1a-1c are structural schematic diagrams of the present disclosure, wherein FIGS. 1a-1c show three arrangements of a film liquid holdup layer of the present disclosure;

BRIEF DESCRIPTION OF REFERENCE NUMERALS

Figure 1A:
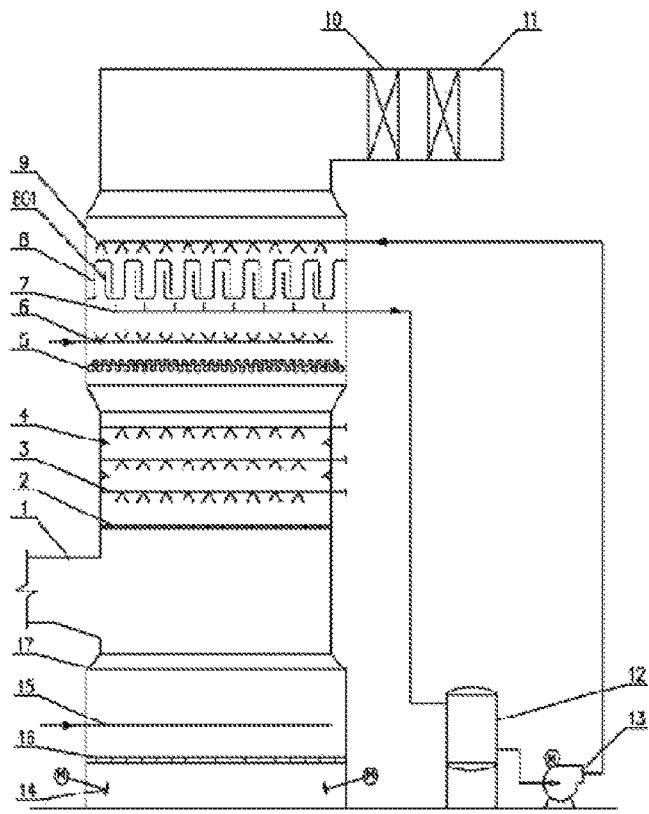
Figure 1B:
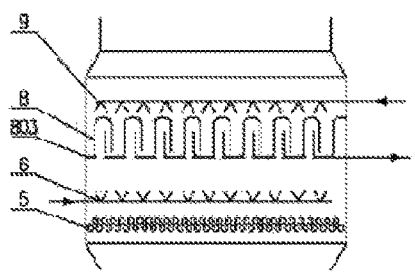
Figure 1C:
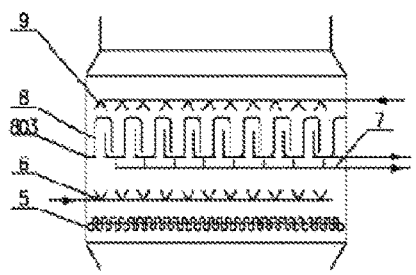
Figure 2:
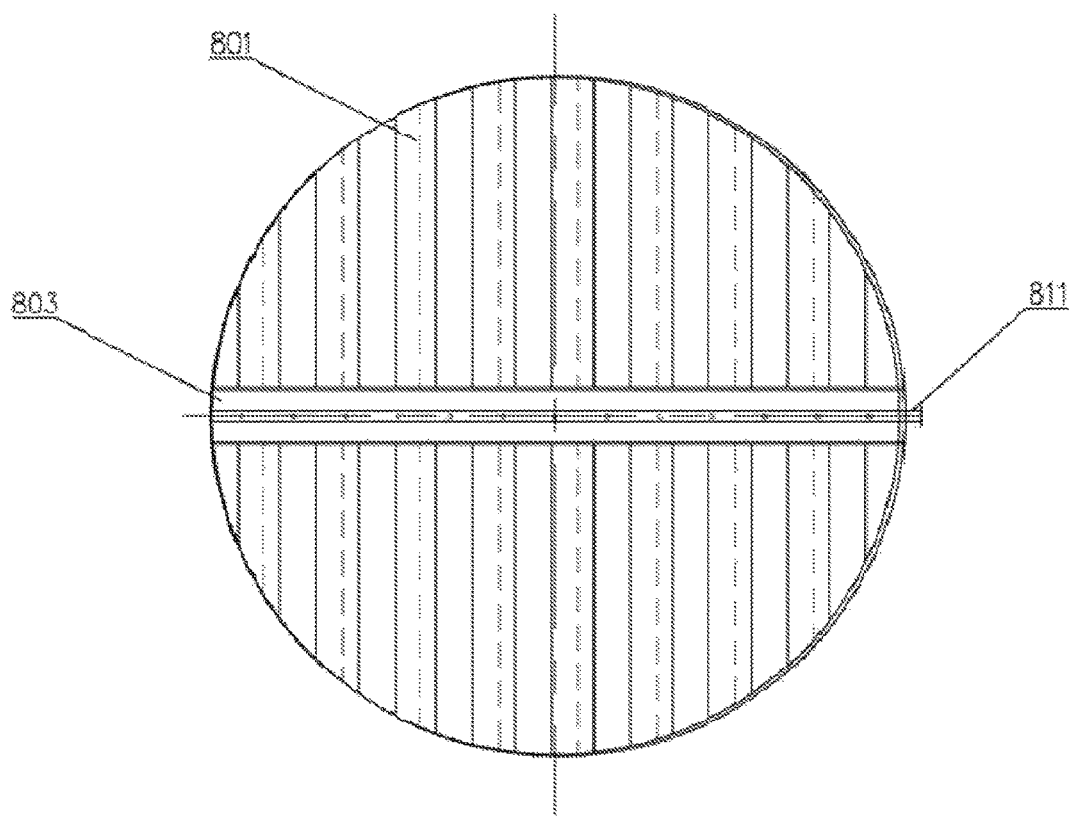
FIG. 2 is a structural schematic diagram of an S-type gas liquid mass transfer mechanism of the present disclosure.
Figure 3:
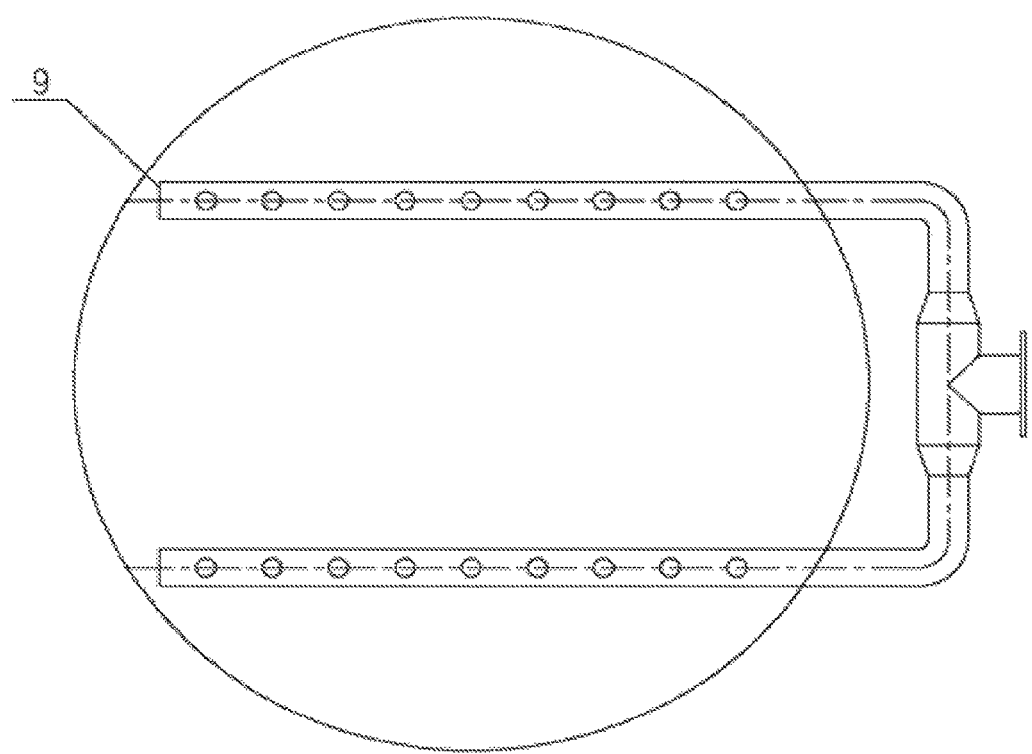
FIG. 3 is a structural schematic diagram of a liquid distributor of the present disclosure.

Reference numerals in the drawings: 1—a gas import, 2—a gas distributing board, 3—a spray layer, 4—a gas liquid mass transfer synergizing ring, 5—a tube demister, 6—a flushing layer, 7—a liquid collector, 8—an S-type gas liquid mass transfer mechanism, 9—a liquid distributor, 10—a horizontal flue demister, 11—a gas discharge port, 12—a liquid holdup layer recycling can, 13—a liquid holdup layer recycling pump, 14—an agitator, 15—an oxidation air distributing tube, 16—a separation mechanism, 1601—a perforated plate, 1602—a plurality of pipes, 17—a tower body.

801—a tray, 803—a U-shaped support member, 8031—a U-shaped collecting slot, 804—a gas sealing plate, 805—a gas inlet, 806—an intermediate passageway, 807—a gas outlet, 808—a plate, 809—an end portion of an S shape, 810—a bottom clearance, 811—an oxidation air tube, 812—a slot opening.

DETAILED DESCRIPTION

To make the object, technical solutions, and advantages of the present disclosure more clear, the present disclosure will be further described in detail below with reference to the drawings and embodiments. It should be understood that the specific embodiments described herein are for illustration purpose only, and are not intended to limit the present disclosure.

In an preferable embodiment of the present disclosure, as shown in FIG. 1a, a high-efficiency gradient hierarchy complex desulfurizing tower comprises a tower body 17, a gas import 1 is provided in the middle of the tower body 17, a gas discharge port 11 is provided at the top of the tower body 17, and the tower body 17 comprises an oxidization and crystallization stage, a coarse desulfurization and dedusting stage, a fine desulfurization and dedusting stage, and a horizontal demisting stage from the bottom up; wherein, The oxidization and crystallization stage comprises a slurry pond provided at the bottom of the tower body 17, and a separation mechanism 16 horizontally provided in the slurry pond and separating the slurry pond into an upper area and a lower area, the upper area of oxidation is provided with a plurality of oxidation air distributing tubes 15, and the lower area of crystallization is provided with a plurality of agitators 14;

The coarse desulfurization and dedusting stage comprises a gas distributing board 2 that is placed above the gas import 1, and a multi-layer spray layer 3 that is placed above the gas distributing board 2, the spray layer 3 is connected to the crystallization area of the slurry pond;

The fine desulfurization and dedusting stage comprises a tube demister 5, a flushing layer 6 that is placed above the tube demister 5, a film liquid holdup layer that is placed above the flushing layer 6, and a liquid holdup layer recycling can 12 connected to the film liquid holdup layer, and the pH value of slurry in the liquid holdup layer recycling can 12 is higher than the pH value of slurry in the slurry pond.

In one embodiment of the present disclosure, the film liquid holdup layer of the present disclosure has the following structures.

The film liquid holdup layer comprises a liquid collector (7), an S-type gas liquid mass transfer mechanism (8) and a liquid distributor (9) from the bottom up, the liquid collector (7) is connected to an inlet of the liquid holdup layer recycling can (12), and an outlet of the liquid holdup layer recycling can (12) is connected to the liquid distributor (9) by a liquid holdup layer recycling pump (13).

In another embodiment of the present disclosure, the film liquid holdup layer comprises the S-type gas liquid mass transfer mechanism (8) and the liquid distributor (9) from the bottom up, a U-shaped collecting slot (8031) in the S-type gas liquid mass transfer mechanism (8) is connected to the inlet of the liquid holdup layer recycling can (12), and the outlet of the liquid holdup layer recycling can (12) is connected to the liquid distributor (9) by the liquid holdup layer recycling pump (13).

In another embodiment of the present disclosure, the film liquid holdup layer comprises the liquid collector (7), the S-type gas liquid mass transfer mechanism (8) and the liquid distributor (9) from the bottom up, the liquid collector (7) and the U-shaped collecting slot (8031) in the S-type gas liquid mass transfer mechanism (8) are all connected to the inlet of the liquid holdup layer recycling can (12), and the outlet of the liquid holdup layer recycling can (12) is connected to the liquid distributor (9) by the liquid holdup layer recycling pump (13).

The S-type gas liquid mass transfer mechanism (8) and/or the liquid collector (7) of the film liquid holdup layer of the present disclosure may both have a slurry collection function, thus, in certain embodiments, use of the liquid collector (7) can be omitted for different purposes. Of course a design may comprise both of the S-type gas liquid mass transfer mechanism (8) and the liquid collector (7) so that the slurry collection function can be better performed. As further explained herein, in particular, when the diameter of the desulfurizing tower is small, the liquid collector (7) is a beneficial redundancy design, but when the diameter of the desulfurizing tower is large, use of the liquid collector (7) is preferable.

Figure 6:
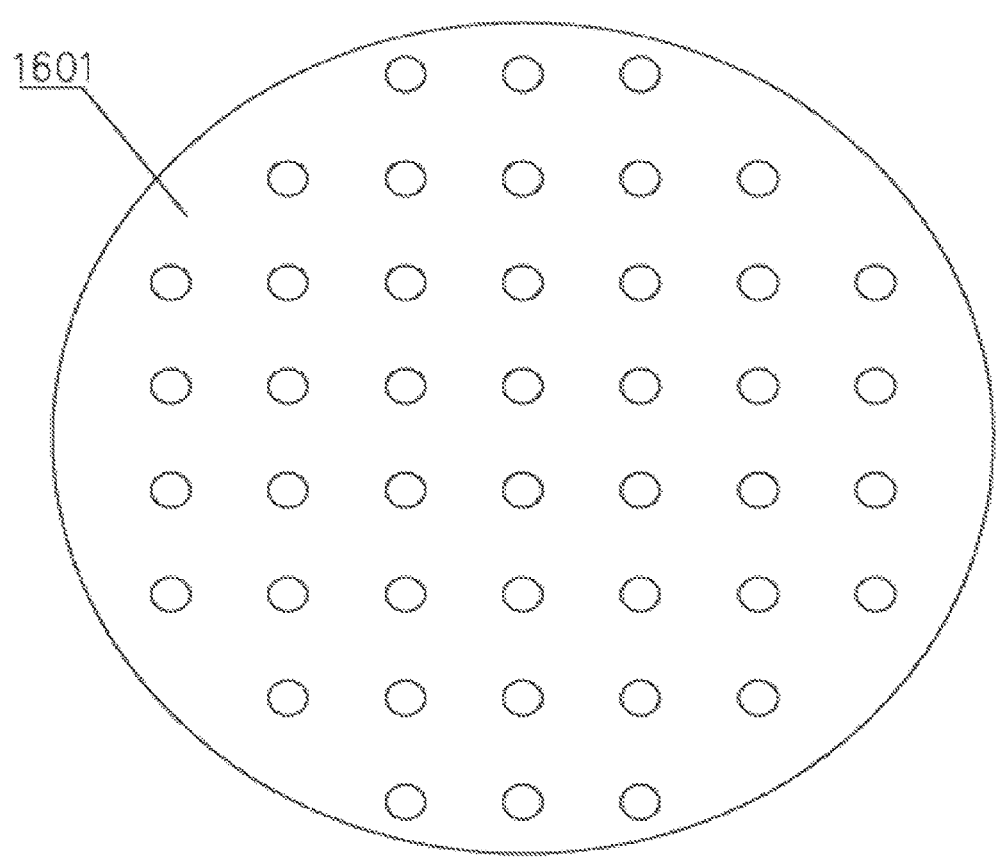
FIG. 6 is a structural schematic diagram of a separation mechanism according to one embodiment of the present disclosure.
Figure 7:
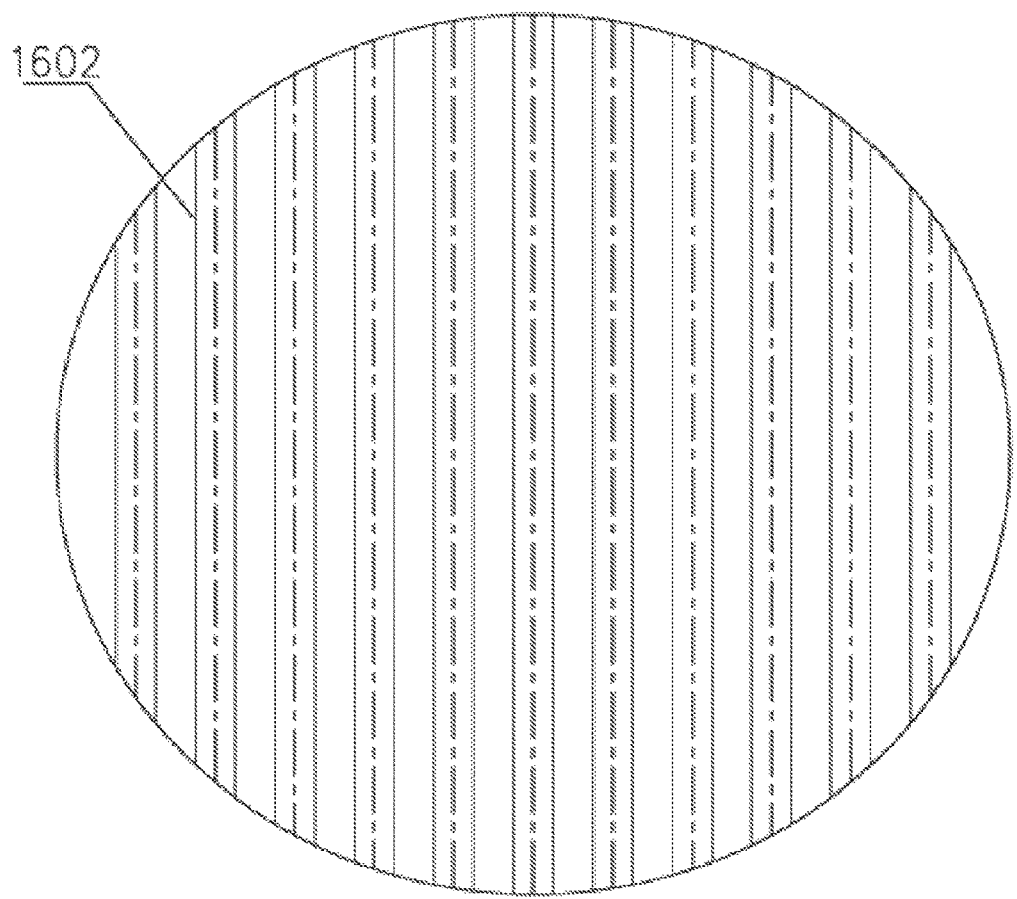
FIG. 7 is a structural schematic diagram of a separation mechanism according to another embodiment of the present disclosure.
Figure 8:
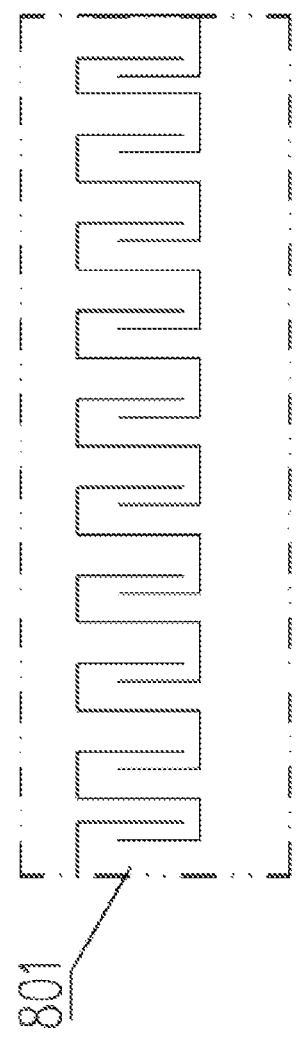
FIGS. 8-9 are structural schematic diagrams of a tray of an S-type gas liquid mass transfer mechanism of the present disclosure.
Figure 9:
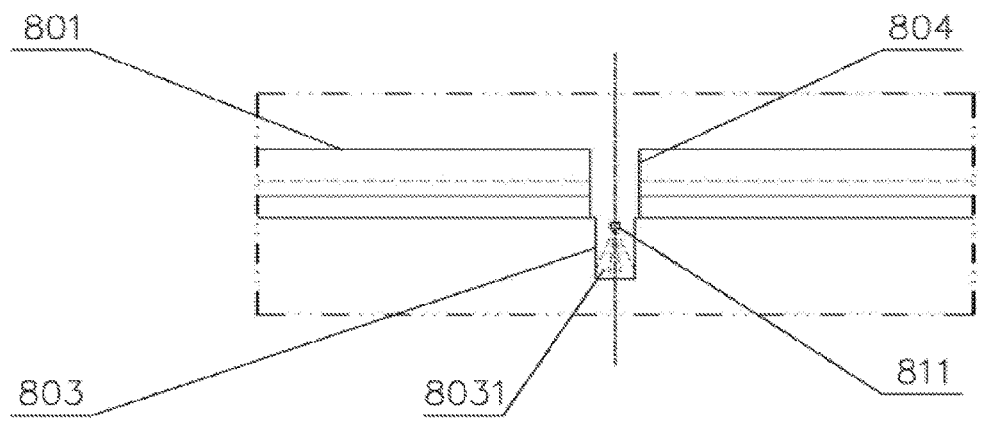
Figure 10:
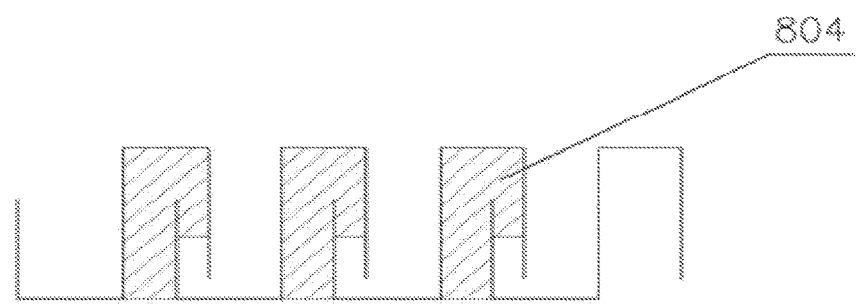
FIG. 10 is a structural schematic diagram of a gas sealing plate of an S-type gas liquid mass transfer mechanism of the present disclosure.

In a preferred embodiment of the present disclosure, as shown in FIG. 6 and FIG. 7, the separation mechanism 16 is a perforated plate 1601, or a plurality of pipes 1602 placed side by side.

Figure 4:
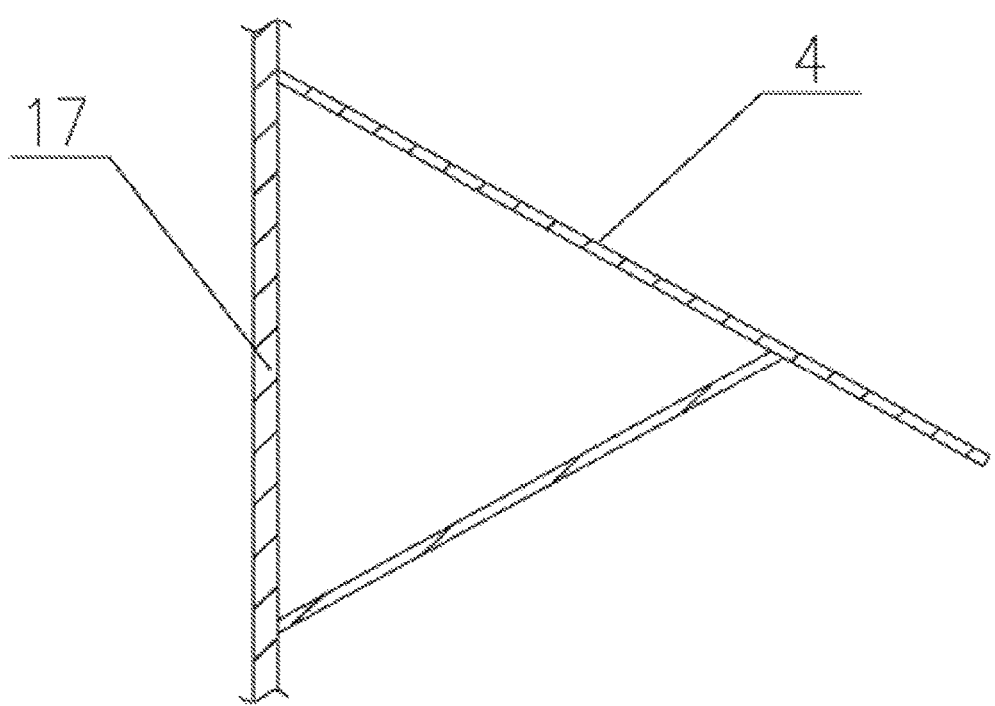
FIG. 4 is a structural schematic diagram of a gas liquid mass transfer synergizing ring of the present disclosure.
Figure 5:
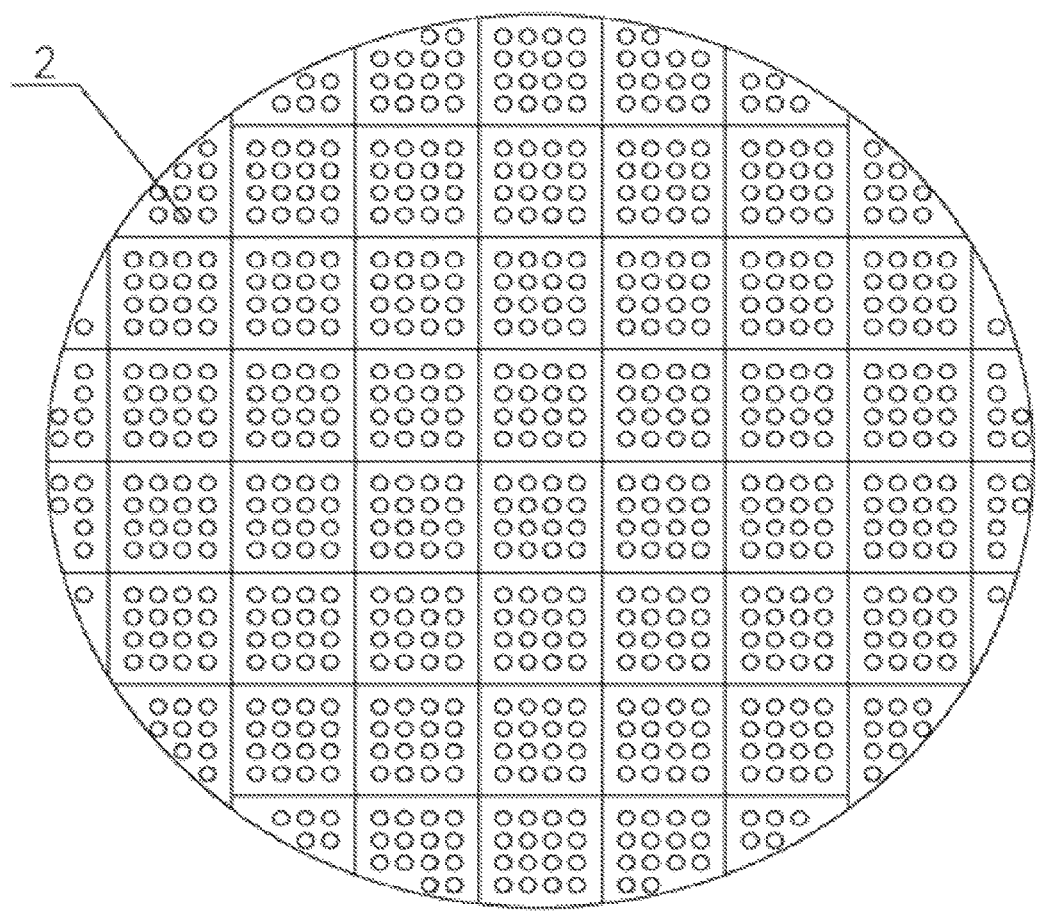
FIG. 5 is a structural schematic diagram of a gas distributing board of the present disclosure.

In a preferred embodiment of the present disclosure, as shown in FIG. 1a and FIG. 4, a gas liquid mass transfer synergizing ring 4 is placed on interior wall of the tower body 17 below each layer of the spray layer 3, and the vertical cross section of the gas liquid mass transfer synergizing ring 4 is a triangle, wherein the height of the gas liquid mass transfer synergizing ring 4 is 300 mm to 2000 mm.

In a preferred embodiment of the present disclosure, as shown in FIG. 1a, nozzles on the spray layer 3 are unitary nozzles or binary atomizing nozzles.

In a preferred embodiment of the present disclosure, as shown in FIG. 1a, the slurry pond is loaded with gypsum slurry, and the pH value of the gypsum slurry is 5.2 to 5.8. In a preferred embodiment of the present disclosure, as shown in FIG. 1a, the liquid holdup layer recycling can 12 is loaded with limestone slurry, and the pH value of the limestone slurry is 5.8 to 6.4.

In an preferable embodiment of the present disclosure, as shown in FIG. 2 and FIGS. 8 to 12, it is one structure for S-type gas liquid mass transfer mechanism, the structure comprises at least one U-shaped support member 803 and a tray 801;

The U-shaped support member 803 is fixedly installed in the tower body 17, the U-shaped support member 803 is provided with the U-shaped collecting slot 8031, an oxidation air tube 811 is installed in the U-shaped collecting slot 8031, and a plurality of vent holes are provided on the bottom of the oxidation air tube 811; The tray 801 is vertically installed above the U-shaped support member 803, the tray 801 is formed by a plurality of elongated plates 808 with lateral S-shaped cross sections arranged in parallel, end portions 809 of the S-shapes of the adjacent plates 808 are interlaced and arranged with spacing, the spacing form intermediate channels 806, downward-facing openings of the plates 808 form gas inlets 805, upward-facing openings of the plates 808 form gas outlets 807, and the plates 808 are provided with gas sealing plates 804 at both sides of the gas inlets 805.

Figure 12A:
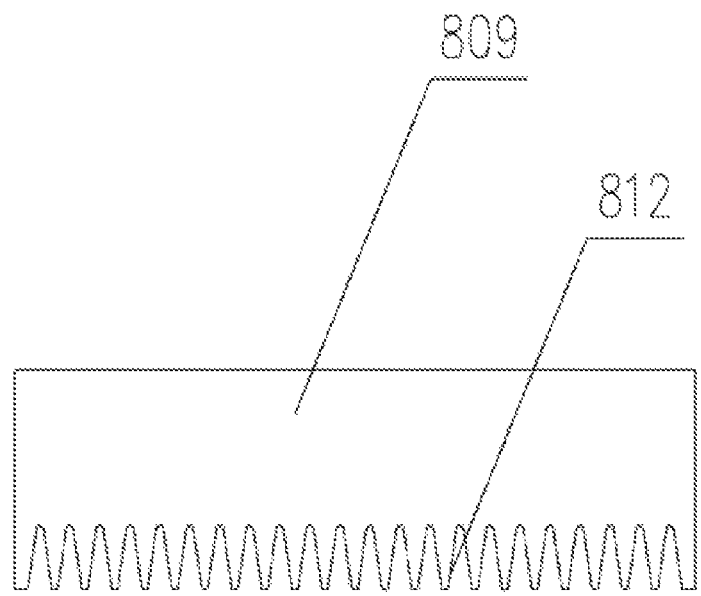
FIG. 12a is a structural schematic diagram of a trapezoidal slot opening of an S-type gas liquid mass transfer mechanism of the present disclosure.
Figure 12B:
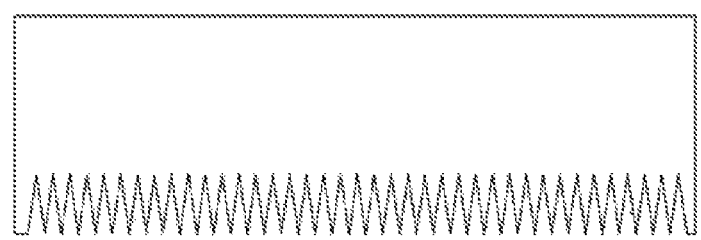
FIG. 12b is a structural schematic diagram of a triangular slot opening of an S-type gas liquid mass transfer mechanism of the present disclosure.
Figure 12C:
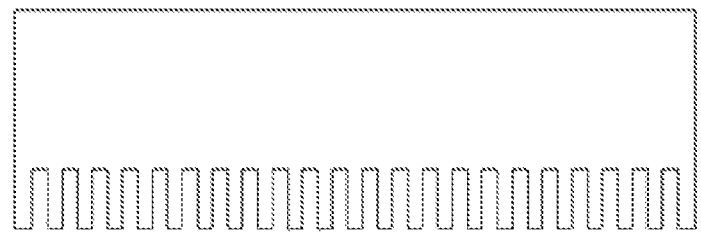
FIG. 12c is a structural schematic diagram of a rectangular slot opening of an S-type gas liquid mass transfer mechanism of the present disclosure.

In a preferred embodiment of the present disclosure, as shown in FIGS. 12a to 12c, lower margins of the end portions 809 of the S-shapes of the plates 808 in the gas outlets 807 are provided with uniformly spaced slot openings 812.

In a preferred embodiment of the present disclosure, as shown in FIGS. 12a to 12c, the shape of the slot openings 812 is a rectangle, a triangle or a trapezoid.

Figure 11:
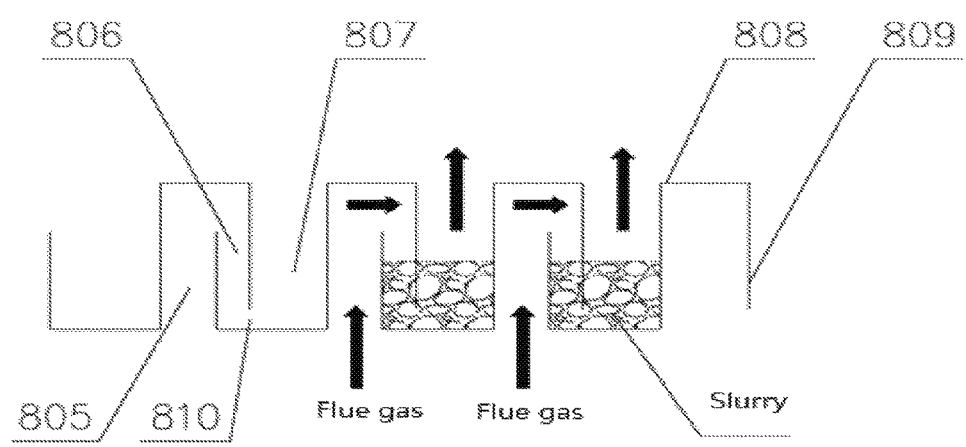
FIG. 11 is a structural schematic diagram of a gas passageway of an S-type gas liquid mass transfer mechanism of the present disclosure.

In a preferred embodiment of the present disclosure, as shown in FIG. 11, the area of the gas outlets 807 is 1.5 to 4 times the area of the intermediate channels 806. The area of the gas inlets 805 is 1 to 4 times the area of the intermediate channels 806. The ratios of the inlets, the outlets and the channels are adjusted so that the area of the gas outlets to the area of the intermediate channels is adjusted from a conventional near equal ratio relationship to decreased area of intermediate channels and increased area of gas outlets, so that increased flow rate in the intermediate channels may prevent the slurry from deposition and decreased flow rate in the gas outlets may prevent a large amount of entrainment due to too great ejection.

In a preferred embodiment of the present disclosure, as shown in FIG. 11, bottom clearances 810 between the end portions 809 of the S-shapes of the plates 808 in the gas outlets 807 and the bottoms of the gas outlets 807 are over 20 mm, preferably 20 to 50 mm, and increasing the bottom clearances can prevent blockage by deposited fouling.

Installed above the spray layer of the desulfurizing tower of the present disclosure, the U-shaped support member is designed as a U-shape with an upper opening, and forms the U-shaped collecting slot which is used for collecting slurry from the tray and performs the function of a slurry collecting slot. The U-shaped support member is provided with a pipe connection in the bottom or the side which is connected to the slurry pipeline, and the collected slurry flows to the outside of the tower by the slurry pipeline. The tray is provided above the U-shaped support member, and is formed by a plurality of adjacent plates in which one plate covers another, and the plates form the gas inlets, the intermediate channels and the gas outlets, and the direction of the elongated plates is vertical to the U-shaped support member. The gas sealing plates are provided at the end portions of the plates.

The structure of the S-type gas liquid mass transfer mechanism of the present disclosure can adapt to the high gas velocity, suspension slurry medium and variable load operating conditions of limestone-gypsum wet desulfurization, can perform functions of segmental collection and segmental absorption of the desulfurizing tower, and has the features of simple structure, stable operation, high desulfurization and dedusting efficiency, and high load adaptability. Specific S-type gas liquid mass transfer mechanism has:

(1) High-efficiency desulfurization function. Limestone slurry with a high pH value is distributed to the tray by the slurry pipeline that is above the tray and from the outside of the tower, the slurry flows into the U-shaped collecting slot along the parallel direction of the plates, the slurry in the U-shaped collecting slot then flows to the outside of the tower by the slurry pipeline to form a cycle, thus the slurry forms a layer of limestone slurry film on the tray. The flow direction of the liquid is changed from conventional vertical direction of the plates to parallel direction of the plates so that the flow path of the liquid has higher patency, and the suspension is prevented from deposition and fouling. The flue gases enter the intermediate channels through the gas inlets, enter the slurry film on the tray horizontally through the bottom clearances, and leave the tray through the gas outlet, and the flue gases mix thoroughly with the slurry, form the froth regime or the steady spray regime and interact with the slurry; the range of the gas velocity is increased from the conventional range of lower than 0.8 to 1.2 m/s to a range of 1 m/s to 3 m/s; conversion of gas liquid contact regime from the bubbling regime to the froth regime or the steady spray regime can increase mass transfer area and improve mass transfer effect while preventing the slurry particles from deposition. Gas and liquid contact thoroughly under high pH conditions, and the desulfurization efficiency is significantly improved to 99.5%. Since the device has a function of separate circulation of the collected slurry, it can perform segmental absorption; the device is arranged above spray layers of conventional spray desulfurizing towers, thus slurry with high pH of pH>5.8 can be applied in the device, and equilibrium condition is changed.

(2) High-efficiency dedusting function. A full coverage liquid film is formed on the tray, and when gas enters the liquid film horizontally through the slot openings, a large amount of bubbles are stirred up, so that the gas liquid contact area is increased; and while the flue dust is under the influence of inertia and diffusion effects, it is continuously disturbed by the foams, so that the flue dust continuously changes directions, the chance of contact between the flue dust and the liquid is increased, and the flue dust is further removed. Since dedusting of the device comprises trapping of the flue dust by the bubbles and the liquid film, the dedusting effect of the device is higher than the dedusting efficiency of spraying, in particular, the performance of removing fine dust of PM2.5 or less is very high, and far better than the dedusting efficiency of spray washing. At the same time, the device does not have the large amount of fine mist droplets ejected by nozzles of spray towers using pressure, which decreases the mist droplet load at the inlet of the demister and helps to improve demisting effect of subsequent demisters, and the contribution by suspended gypsum in the mist droplets to the flue dust is reduced with reduction of the concentration of the mist droplets.

(3) High load adaptability. The liquid level of the liquid film, the flow rate of the slurry and the pH value of the slurry of the tray may all be adjusted on-line, and the said factors are directly related to the desulfurization and dedusting efficiency, thus the desulfurization and dedusting efficiency of the device may be adjusted in real time according to actual load demand.

(4) Simple structure and stable operation. The device is static equipment, and its installation is completed at one time. By modification of the tray, the system can effectively adapt to the high gas velocity, suspension slurry medium and variable load operating conditions of limestone-gypsum wet desulfurization, and can operate steadily for a long term.

In addition, in a preferred embodiment of the present disclosure, as shown in FIG. 1a, the horizontal demisting stage comprises level 1 to level 4 horizontal flue demisters 10, which are provided with independent water flushing and water recovering units.

In addition, when the present disclosure is applied, the slurry pond at the bottom of the tower body is separated by the separation mechanism into the oxidation area and the crystallization area, and the oxidation air distributing tubes are provided in the oxidation area to guarantee high-efficient oxidation of calcium sulfite in the slurry pond, and the oxidation air distributing tubes utilize alloy materials or non-metallic materials; the relatively independent crystallization area can allow the crystal particles of gypsum to grow larger, which is not only advantageous to subsequent operation of a dehydration system, but can also guarantee demisting effect, and improve the desulfurization and dedusting efficiency; further, agitators or other stirring agitator mechanism may be provided in the crystallization area to prevent deposition and fouling of gypsum.

Gradient hierarchy complex desulfurization techniques are applied in the present disclosure, and different absorbents are applied at different parts of the desulfurizing tower; the pH value of the slurry increases from the bottom up; in particular, limestone slurry is used as absorbent in the fine desulfurization and dedusting stage, the pH value can be controlled at a very high level of up to 5.8 to 6.4, and the high activity of the limestone slurry is fully deployed; the liquid holdup layer recycling can provides the limestone slurry with high pH value to the film liquid holdup layer. The absorbent used in the spray layer is mixed slurry of limestone-gypsum, and the content of limestone in the mixed slurry gradually increases from the bottom up, thus the pH value of the mixed slurry also increases from the bottom up.

In operation, the flue gases enters the tower by the gas import, and due to the obstacle by the gas distributing board, the flue gases diffuse along the gas distributing board (the gas distributing board is a perforated plate) to the surroundings, so that the velocities of the flue gases with high velocity and the flue gases with low velocity in a cross section of the tower body remix with each other to achieve redistribution of the flow rate of the flue gases, and the flue gases passing through the gas distributing board is evenly distributed in a cross section of the tower body so that an even distribution of the flue gases is achieved, and the problem of bias flow of the flue gases can be solved and the desulfurization and dedusting efficiency is improved; then coarse desulfurization and dedusting is performed under the action of the spray layer, the number of layers in the spray layer is 1 to 5, and each layer of the spray layer is provided with independent circulation pump and circulation line system, the gas liquid mass transfer synergizing ring is placed on interior wall of the tower body under each layer of the spray layer, the nozzles on the spray layer are unitary nozzles or binary atomizing nozzles, and if the binary atomizing nozzles are applied, the spray from the two outlets of the binary atomizing nozzles can be of a same direction or of opposite directions.

By the tube demister, the fine desulfurization and dedusting stage intercepts a large amount of gypsum slurry, and by the S-type gas liquid mass transfer mechanism, the mass transfer effect can be further improved, so that the whole tower has ultra-high desulfurization efficiency and dedusting performance, and the total desulfurization efficiency of the desulfurizing tower can be 99%, or 99.5% or more; when the $SO_2$ content at the gas import of the desulfurizing tower is 6500 mg/$Nm^3$, the $SO_2$ content at the gas discharge port can be reduced to 35 mg/$Nm^3$ or less, and when the $SO_2$ content at the gas import of the desulfurizing tower is 5000 mg/$Nm^3$, the $SO_2$ content at the gas discharge port can be reduced to 20 mg/$Nm^3$ or less, so that deep desulfurization of the desulfurizing tower is achieved; further, the nozzles of the flushing layer are upward-facing, and flush the lower part of the film liquid holdup layer to prevent the lower part of the film liquid holdup layer from fouling. At the same time, gases containing $SO_2$ and flue dust enter the limestone slurry film layer (the height of the limestone slurry film on the film liquid holdup layer is 20 mm to 150 mm) by the S-type gas liquid mass transfer mechanism, and stir up a large amount of bubbles to form a foam layer, $SO_2$ is absorbed by the slurry in the foam layer, and while the dust is under the influence of inertia and diffusion effects, it is continuously disturbed by the foams, so that the dust continuously changes directions, the chance of contact between the dust and the liquid is increased, and the flue gases are purified. The dedusting effect of a bubbling dedustor is higher than the dedusting efficiency of a spray tower dedustor, in particular, the dedusting performance for fine dust of PM2.5 or less is high, and is far better than the dedusting efficiency of a spray layer. Therefore, the dedusting efficiency of the present disclosure increases from 50% of a common desulfurizing tower to 90% or more, and the flue dust content at the gas discharge port of the desulfurizing tower can be reduced to 5 mg/$Nm^3$ or less, and high-efficiency dedusting is also achieved as well as deep desulfurization.

It is to be understood that, it will be apparent to one of ordinary skill in the art that various changes and modifications can be made therein on the above description basis without departing from the spirit and scope of the present disclosure.

INDUSTRIAL APPLICABILITY

The desulfurizing tower device of the present disclosure can be applied in industrial desulfurization and dedusting so that it can be in practical use.

What is claimed is:

1. A high-efficiency gradient hierarchy complex desulfurizing tower comprising a tower body, a gas import being provided in the middle of the tower body, a gas discharge port being provided at the top of the tower body,
   wherein, the tower body comprises an oxidization and crystallization stage, a coarse desulfurization and dedusting stage, a fine desulfurization and dedusting stage, and a horizontal demisting stage from the bottom up;
   the oxidization and crystallization stage comprises a slurry pond provided at the bottom of the tower body, and a separation mechanism horizontally provided in the slurry pond and separating the slurry pond into an upper area and a lower area, the upper area of oxidation is provided with a plurality of oxidation air distributing tubes, and the lower area of crystallization is provided with a plurality of agitators;
   the coarse desulfurization and dedusting stage comprises a gas distributing board that is placed above the gas import, and a multi-layer spray layer that is placed above the gas distributing board, the spray layer is connected to the crystallization area of the slurry pond;
   the fine desulfurization and dedusting stage comprises a tube demister, a flushing layer that is placed above the tube demister, a film liquid holdup layer that is placed above the flushing layer, and a liquid holdup layer recycling can connected to the film liquid holdup layer, the pH value of slurry in the liquid holdup layer recycling can is higher than the pH value of slurry in the slurry pond,
   the film liquid holdup layer has one of the three structures below:
   (a) the film liquid holdup layer comprises a liquid collector, an S-type gas liquid mass transfer mechanism and a liquid distributor from the bottom up, the liquid collector is connected to an inlet of the liquid holdup layer recycling can, and an outlet of the liquid holdup layer recycling can is connected to the liquid distributor by a liquid holdup layer recycling pump; or, (b) the film liquid holdup layer comprises the S-type gas liquid mass transfer mechanism and the liquid distributor from the bottom up, a U-shaped collecting slot in the S-type gas liquid mass transfer mechanism is connected to the inlet of the liquid holdup layer recycling can, and the outlet of the liquid holdup layer recycling can is connected to the liquid distributor by the liquid holdup layer recycling pump; or, (c) the film liquid holdup layer comprises the liquid collector, the S-type gas liquid mass transfer mechanism and the liquid distributor from the bottom up, the liquid collector and the U-shaped collecting slot in the S-type gas liquid mass transfer mechanism are all connected to the inlet of the liquid holdup layer recycling can, and the outlet of the liquid holdup layer recycling can is connected to the liquid distributor by the liquid holdup layer recycling pump.

2. The desulfurizing tower of claim 1, wherein the separation mechanism is a perforated plate, or a plurality of pipes placed side by side.

3. The desulfurizing tower of claim 1, wherein a gas liquid mass transfer synergizing ring is placed on interior wall of the tower body under each layer of the spray layer, and the vertical cross section of the gas liquid mass transfer synergizing ring is a triangle.

4. The desulfurizing tower of claim 3, wherein the height of the gas liquid mass transfer synergizing ring is 300 mm to 2000 mm.

5. The desulfurizing tower of claim 1, wherein nozzles on the spray layer are unitary nozzles or binary atomizing nozzles.

6. The desulfurizing tower of claim 1, wherein the slurry pond is loaded with gypsum slurry, and the pH value of the gypsum slurry is 5.2 to 5.8.

7. The desulfurizing tower of claim 1, wherein the liquid holdup layer recycling can is loaded with limestone slurry, and the pH value of the limestone slurry is 5.8 to 6.4.

8. The desulfurizing tower of claim 1, wherein the S-type gas liquid mass transfer mechanism comprises at least one U-shaped support member and a tray;

the U-shaped support member is fixedly installed in an absorption tower, the U-shaped support member is provided with the U-shaped collecting slot, an oxidation air tube is installed in the U-shaped collecting slot, and a plurality of vent holes are provided on the bottom of the oxidation air tube;

the tray is vertically installed above the U-shaped support member, the tray is formed by a plurality of elongated plates with lateral S-shaped cross sections arranged in parallel, end portions of the S-shapes of adjacent plates are interlaced and arranged with spacing, the spacing form intermediate channels, downward-facing openings of the plates form gas inlets, upward-facing openings of the plates form gas outlets, and the plates are provided with gas sealing plates at both sides of the gas inlets.

9. The desulfurizing tower of claim 8, wherein lower margins of the end portions of the S-shapes of the plates in the gas outlets are provided with uniformly spaced slot openings.

10. The desulfurizing tower of claim 9, wherein the shape of the slot openings is a rectangle, a triangle or a trapezoid.

11. The desulfurizing tower of claim 8, wherein the area of the gas outlets is 1.5 to 4 times the area of the intermediate channels.

12. The desulfurizing tower of claim 8, wherein the area of the gas inlets is 1 to 4 times the area of the intermediate channels.

13. The desulfurizing tower of claim 8, wherein bottom clearances between the end portions of the S-shapes of the plates in the gas outlets and the bottoms of the gas outlets are over 20 mm.

14. The desulfurizing tower of claim 1, wherein the horizontal demisting stage comprises level 1 to level 4 horizontal flue demisters, which are provided with independent water flushing and water recovering units.

\* \* \* \* \*